March 21, 1961

R. HAGEN ET AL 2,975,473

MANUFACTURE OF HOLLOW PLASTIC ARTICLES

Filed Feb. 13, 1959

INVENTORS.
REINOLD HAGEN
NORBERT HAGEN
BY

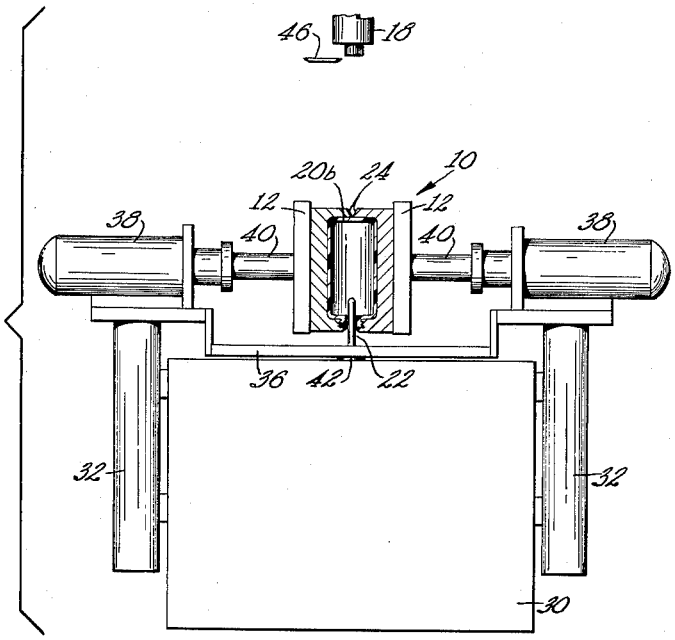
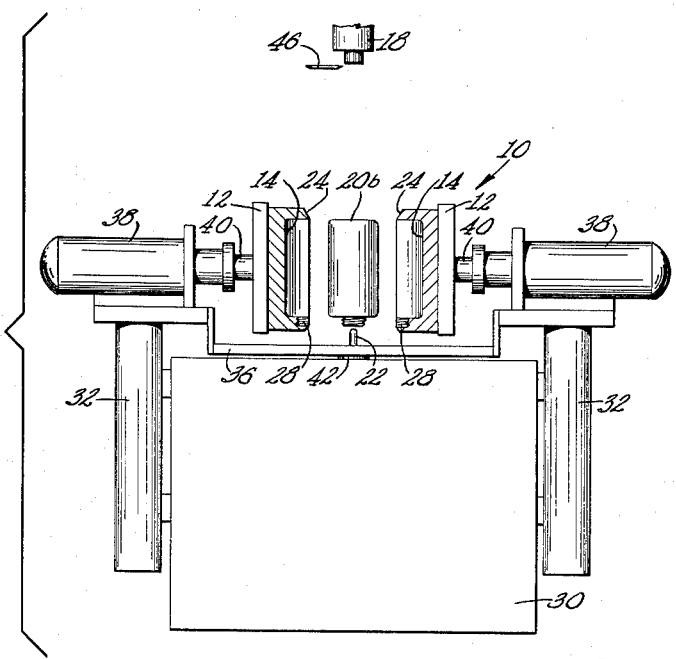

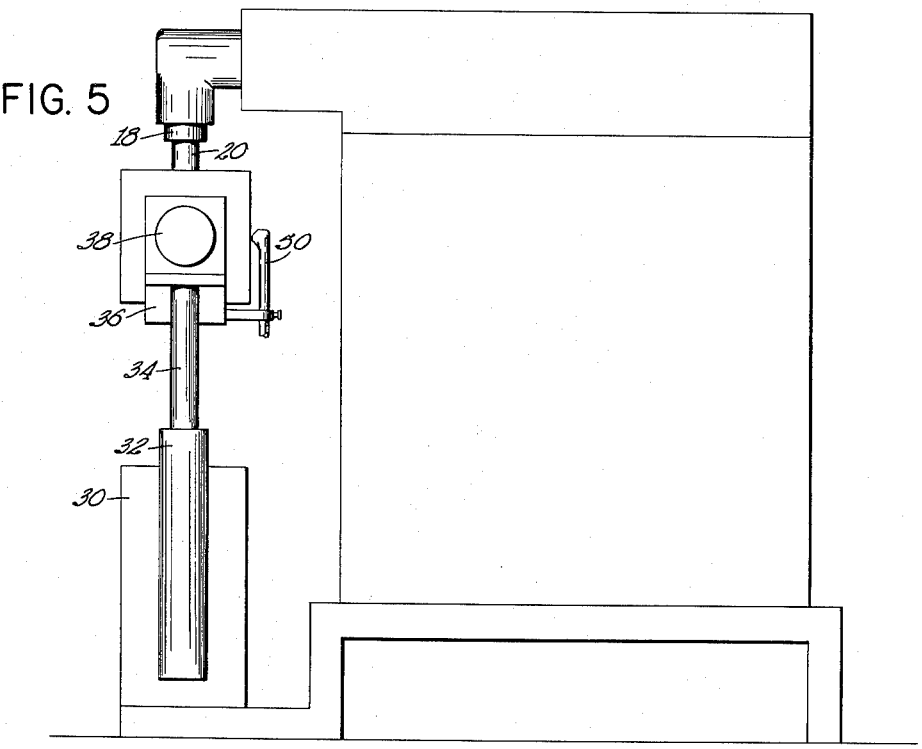
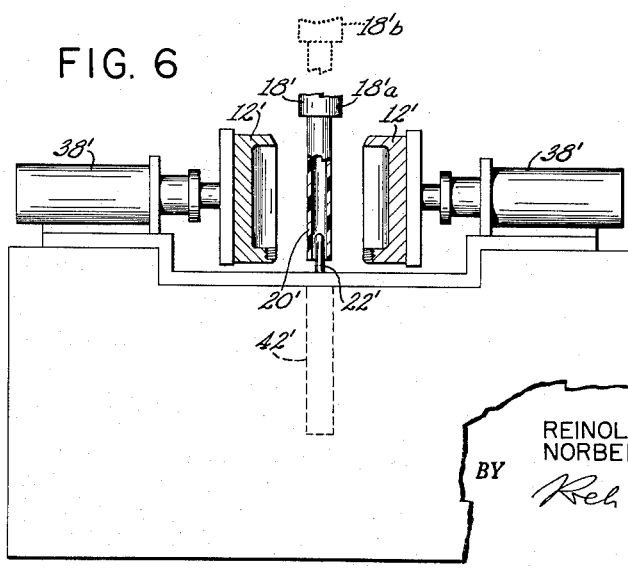

March 21, 1961 R. HAGEN ET AL 2,975,473
MANUFACTURE OF HOLLOW PLASTIC ARTICLES
Filed Feb. 13, 1959 6 Sheets-Sheet 4
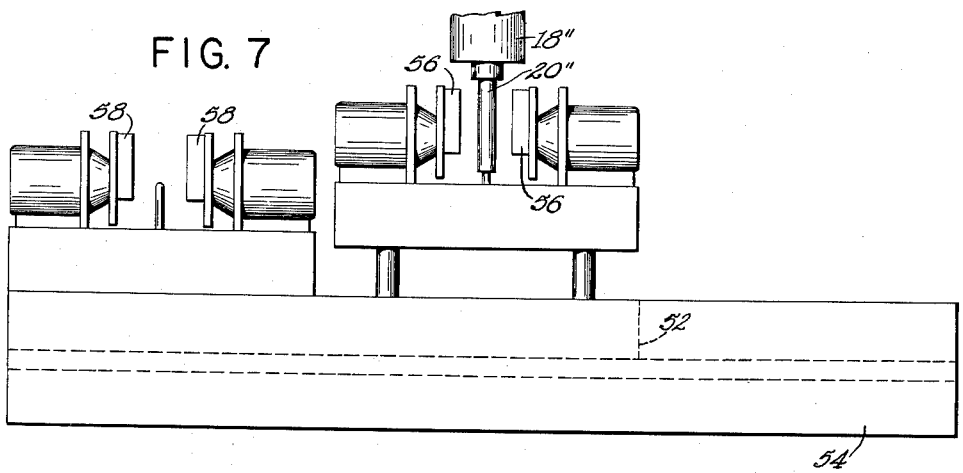
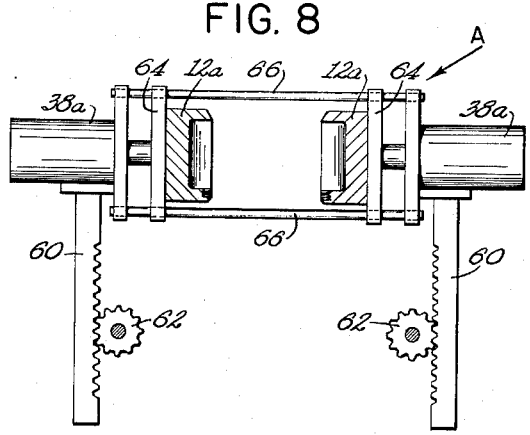
INVENTORS.
REINOLD HAGEN
NORBERT HAGEN
BY

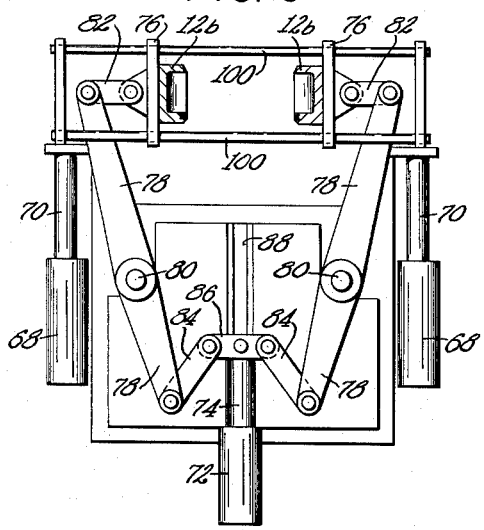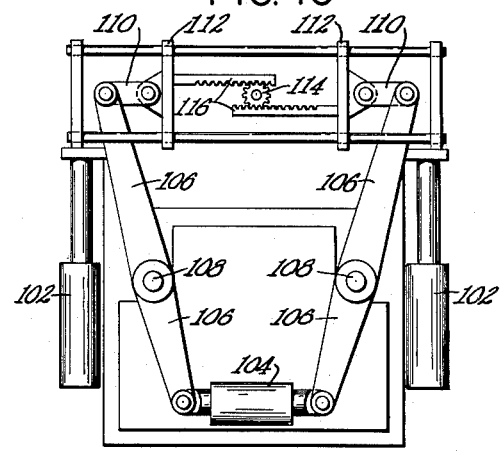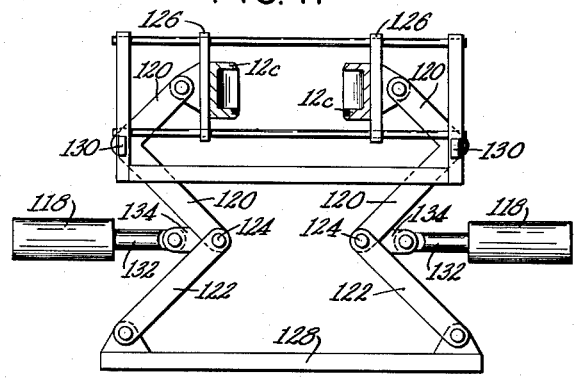

March 21, 1961    R. HAGEN ET AL    2,975,473
MANUFACTURE OF HOLLOW PLASTIC ARTICLES

INVENTORS.
REINOLD HAGEN
NORBERT HAGEN
BY 2,975,473
MANUFACTURE OF HOLLOW PLASTIC ARTICLES
Reinold Hagen, Hangelar, uber Siegburg, Rhineland, Germany, and Norbert Hagen, 23 Heinrichstrasse, Siegburg, Rhineland, Germany
Filed Feb. 13, 1959, Ser. No. 793,045
Claims priority, application Great Britain June 17, 1953
19 Claims. (Cl. 18—5)

This invention relates to the manufacture of bottles and other hollow articles from plastic materials, and more particularly to a process and an apparatus for blowing such articles. The term "hollow articles" is understood to comprise hollow bodies of any shape, provided the shape of the embryo article, while in condition of plasticity, permits its being blown by fluid pressure to the desired final shape.

For the purpose of the invention, any plastic material may be used which is capable of becoming softened and workable when heated at relatively low temperatures and which, while soft and workable, may be expanded under fluid pressure into articles of desired shapes. The blown articles, upon cooling, become rigid. For instance, low, medium and high density polyethylene, polystyrene, plasticized and nonplasticized polyvinyl chloride and nylon may be used.

This application is a continuation-in-part of the copending applications Serial No. 435,547, filed June 9, 1954, by Reinold Hagen, and Serial No. 513,852, filed June 7, 1955, by Reinold Hagen and Norbert Hagen, now Patent No. 2,918,698.

A number of processes have heretofore been suggested to blow articles from plastic materials, ordinarily, but not necessarily, starting with material in form of tubing, and numerous attempts have been made to provide suitable apparatus to carry out such processes.

The primary object of the present invention is to improve the manufacture of hollow plastic articles by blowing.

In producing bottles, other containers, and other hollow articles from plastics, for instance, by extruding and blowing, an extrusion press and a sectional mold, preferably a two-section mold, are generally used. An open-ended tube may be extruded from an annular extrusion nozzle which is mounted above the mold into the space between the open sections of the mold to slip over a so-called blow pipe which projects into the open mold space from opposite the extrusion direction and in alignment with the extruded tube. The blow pipe serves to admit compressed air or any other pressure medium into the embryonic article and to act at the same time as a core to form an opening in the article being produced. As soon as a sufficient length of the open-ended tube is extruded, the mold sections are closed over a portion of the tube, which causes the tube to be pinched shut by the mold sections near the nozzle. At the tube end remote from the nozzle, the material is pressed against and around the blow pipe. The fluid pressure medium is then admitted through the blow pipe to expand the mold-enclosed tube portion against the wall of the mold cavity, where the molded article cools off and becomes rigid.

With the known apparatus to produce hollow plastic articles in a continuous operation, no full advantage could ordinarily be taken of the highest possible rates of extrusion. Generally it was required to slow down the rate of extrusion to adjust same to the capacity of the facilities for forming the article.

To increase the rate of production, rotary turrets have been suggested which carry a number of molds and are operated to move the open sections of one mold after the other into registry with the extrusion head. Such turntable constructions, however, in addition to calling for a plurality of molds, are complicated, of large dimensions, expensive, and require a large floor space.

An important object of the invention centers about a process and an apparatus for the manufacture of hollow plastic articles by blowing, which will make it possible to do the extruding at the highest possible rate and to form the finished article as quickly as will be required by such rate of extrusion. Thus, my invention aims at speeding up and cheapening the manufacture of hollow plastic articles, that is, at an increase in output without an increase in the initial and manufacturing cost.

A more specific object of this invention is to provide an apparatus which is simple, of relatively small dimensions, inexpensive, and does not require a plurality of molds and yet ensures an increased output.

Further objects will be apparent from the following description.

The specification is accompanied by drawings in which:

Fig. 3 shows the closed mold and the nozzle in their far apart positions;

Fig. 4 shows the open mold as does Fig. 1, but in the same far apart positions as shown in Fig. 3;

Fig. 5 is an elevation of an apparatus of the invention, illustrating the means to eject a blown article;

Fig. 6 is a side elevational view of a modified apparatus embodying features of the present invention;

Fig. 7 is a side elevational view of a further modification of the apparatus of the invention;

Fig. 8 illustrates modified means to actuate opposing sections of a mold;

Fig. 9 illustrates another modification of the mold-operating means;

Fig. 10 shows a further modification of mold-operating means;

Fig. 11 shows one more modification of mold-operating means;

Figure 1:
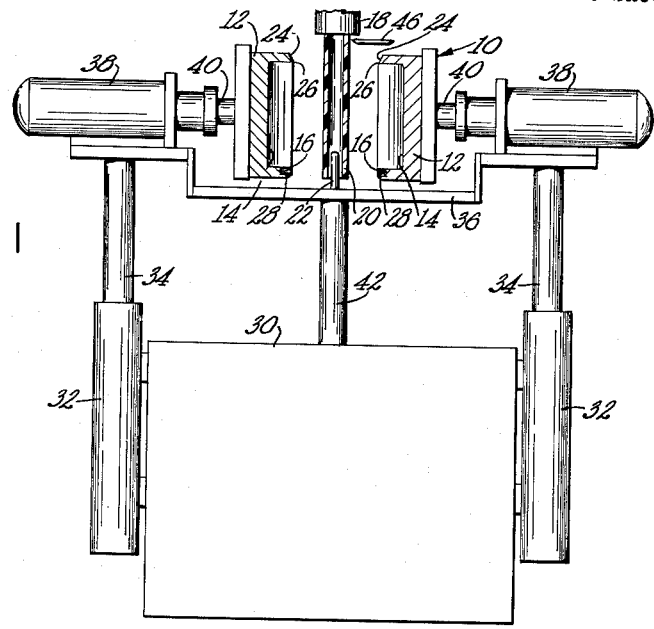
Fig. 1 illustrates, in a side elevational view, an apparatus according to our invention, the mold being shown open and in proximity to the nozzle.

Referring to the drawings in greater detail, and initially to Figs. 1 to 4, a mold generally designated 10 consists of two sections or halves 12, 12, shown in Fig. 1 in open condition. Each of the mold sections is provided with a cavity, and each cavity consists of a body portion 14 and a neck portion 16. In the particular embodiment selected for illustration in Figs. 1 to 4, the two half-cavities complete each other to conform to the shape of a bottle. While the neck portions 16, 16 are shown to form a plain bottle neck, it should be understood that they may also be provided with screw threads to form bottles having a screw-threaded neck. The mold sections may be provided with fluid chambers to receive a cooling fluid to cool the mold.

There is an extrusion nozzle 18 which has an annular outlet orifice to extrude the plastic material used in tubular shape and in condition of plasticity into the open space between the separated mold sections. The tube 20 is extruded in continuous operation to suspend vertically into the open mold space. It has an open end which slips over a blow pipe 22 that extends into the open mold space from opposite the extrusion nozzle and is axially aligned with the extruded tube. The mold sections are beveled at 24, 24 to form sharp edges 26, 26, which edges are not necessarily intended to make a complete cut. Instead, they are provided to pinch the tube. At the side of the mold sections remote from the nozzle, there are openings 28, 28.

There is a block 30 on which two pneumatic cylinders 32, 32 are mounted in a parallel relationship. In these cylinders, pistons 34, 34 are slidingly accommodated to reciprocate in the same direction at any one time. These pistons are connected at their free ends by a cross bar 36 and carry horizontally extending pneumatic cylinders 38, 38. In the latter cylinders, pistons 40, 40, which carry the mold sections 12, 12, slide toward and away from each other. The block 30 also supports a pipe 42 and the blow pipe 22, the pipe 42 being connected to a source (not shown) of fluid pressure, for instance, air pressure.

Figure 2:
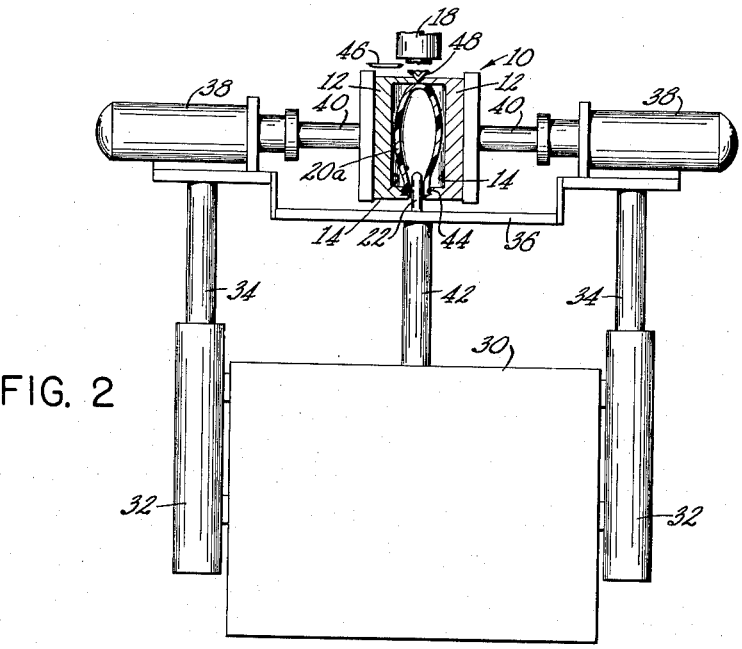
Fig. 2 shows the mold in closed or molding position, but in the same proximity to the nozzle.

When the parts of the apparatus are in the position shown in Fig. 1 and an adequate length of tubing has been extruded, the pistons 40, 40, together with the mold sections 12, 12, are moved, by means of suitable controls (not shown), toward each other to assume the position shown in Fig. 2. As the mold sections close upon a segment of the tube 20, the edges 26, 26 pinch the tube and convert the tube segment within the mold into a bubble 20a, closed at the top and open at the bottom. This bubble constitutes the embryonic form of the bottle to be blown. The tubular end portion 44 of the pinched off bubble is press-molded against the blow pipe 22.

Next, the mold-enclosed tube segment or bubble is severed from the parent body of plastic material in the nozzle. The severing may be done prior to the closing of the mold, but is ordinarily done during or upon the closing of the mold and may be carried out in various ways. If a cutting means is used, and the leading end of tubing to be extruded upon the cutting is to remain open, the cutting may be done across the bottom surface of the nozzle or at least so close to the nozzle bottom surface as to be sure that the cut edge will not be pulled and welded together. It will be apparent that whenever the cutting is done so that the leading end of tubing to be extruded will stay open upon cutting, the trailing end of the severed tube segment will also stay open. From Fig. 2 it will be seen that a knife 46 shown in Fig. 1 on the right-hand side of the tube 20 has moved to the left and has performed the cutting. The cutting may also be effected by an electrically heated wire (600° to 700°). The use of such heated wires is especially useful when a very soft plastic material is employed. It is also possible to tear the tube segment enclosed by the mold from its parent body. Simply by moving nozzle and mold apart, the portion of tubing between nozzle and mold will first stretch, and tearing will then occur at the hottest spot which is at the nozzle. Such tearing will also ensure that both severed ends will stay open.

Then, the mold is lowered. For this purpose, the pistons 34, 34, the cross bar 36, the cylinders 38, 38, the closed mold halves 12, 12, the pipe 42, and the blow pipe 22 are rapidly lowered, that is, at a speed that exceeds the rate of extrusion. The referred to parts assume the positions shown in Fig. 3. Either during the lowering, or, at the latest, when the positions of Fig. 3 are reached, compressed air, any other gaseous, or a liquid pressure medium is blown through the blow pipe 22 into the embryo bottle to expand the embryo form to the desired bottle shape. The plastic material cools and solidifies and will retain the bottle shape that corresponds to the composite cavity 14, 14, 16, 16. The blown bottle 20b is shown in Fig. 3.

The above referred to severing of the mold-enclosed tube segment from the parent plastic material is usually carried out while the nozzle and closed mold are moved apart, but may also be carried out prior or partly prior to the moving apart of nozzle and mold.

The mold halves, while at the same level as in Fig. 3, part. First, the blown bottle is held in its position by the blow pipe 22 (see Fig. 3). It will, therefore, cling to neither of the mold halves. As soon as the mold halves have moved away from the bottle far enough, the pipe 22 is withdrawn rapidly, which does not meet with any difficulty since the bottle material is still sufficiently warm and yieldable. When the halves 12, 12 have moved to the fully apart position, shown in Fig. 4, a short blast of compressed air is sufficient to eject the formed and rigid bottle from the machine. Excess material, such as designated 48 in Fig. 2, will be removed from the bottle upon its removal from the mold.

The mold halves while in open condition are then raised to assume the position of Fig. 1, and the cycle of operation repeats.

The operations of closing the mold, severing the pinched off tube segment from its parent material, blowing the hollow article, lowering the closed mold, opening the mold, ejecting the blown article, raising the mold, etc. are automatically controlled in a predetermined sequence. Changes in any of the sequential operations are easily arranged.

When considering the operations according to Figs 1 to 4, it will be understood that in order to extrude unobstructedly, the mold has to be out of the way of freshly extruded tubing. It is required that extruded tubing suspend freely. The distance and speed of the lowering of the mold, and the timing of all the subsequent operations have to be such that the open mold sections will be ready to enclose another segment of tubing, as soon as extruded in the required length. It is not absolutely necessary that the mold is lowered a distance equal in length to the article to be blown, or even a greater distance. The mold may be opened before it has traveled such a distance. Advantage can be taken, upon the ejection of a blown article, of the time needed for the raising and closing of the open mold sections, which will make it possible for the extrusion to continue while the raising and closing of the mold sections take place, and will bring the extruded tube to the required length.

From Figs. 1 to 4 and their description, it will be clear that the present invention provides a fourfold mold motion, namely, (1) closing of the open sections at a high level, (2) lowering of the closed mold to a low level, (3) opening of the closed mold at the low level, and (4) raising of the open sections to the high level.

Considering the present process in its wide aspect, it will be understood that although Figs. 1 to 4 are intended to illustrate continuous extrusion, our invention embraces also discontinuous extrusion. However, even with discontinuous extrusion, the completion of the article upon the closing of the mold proceeds continuously. Intermittent extrusion may, for instance, become necessary if thick-walled material is used and a longer cooling period is required.

It will also be understood that for the extrusion of the plastic material either a screw or a piston may be employed for feeding purposes. The piston feed is preferably used for an intermittent delivery and whenever the plastic material is very thin when hot. Also, the rate of extrusion is higher with piston-operated machines than with screw-operated ones.

In Fig. 5, an ejecting tube 50 is shown through which a blast, for instance, of compressed air is admitted when the mold sections as shown in Figs. 1 to 4, while at the low level and upon the blowing of an article, have been moved apart, and a blow pipe, such as the blow pipe 22 of Figs. 1 to 4, has been retracted. The air blast is directed against the blown article and will eject the article away from the tube 50.

Fig. 6 illustrates a construction according to the invention, wherein a nozzle 18' is movable in vertical direction, whereas cylinders 38', 38', mold halves 12', 12', a pipe 42', and a blow pipe 22' are stationary. While the movement of mold and nozzle in relation to one another, as shown in Figs. 1 to 4, is effected by movements of the mold, such relative movement, in accordance with Fig. 6, is effected by movements of the nozzle. The condition shown in Fig. 6 corresponds to that shown in Fig. 1. In both cases, a plastic tube is shown to have been extruded into the space between open mold sections, with an end portion at the free end of the tube being slipped over a blow pipe. The open mold sections are in both cases ready to be closed upon a segment of the tube. When working with the apparatus of Fig. 6, the closed mold remains permanently at the same horizontal level, and it is the nozzle which moves from the low or solid line position 18'a to the high or dotted line position 18'b. While the nozzle 18' moves to its high level, the extrusion continues, and when the required length of fresh tubing has been attained or is about to be attained, the nozzle, with freshly extruded tubing suspending therefrom, is lowered to its low level. It will be clear that the extrusion may also continue during the lowering of the nozzle. During the raising and lowering of the nozzle, the blowing takes place, the closed mold is opened, and the blown article is removed, so that the open mold sections will be ready to close again and thus to start a new operating cycle.

In the construction of Fig. 6, the molds 12', 12' perform actually closing and opening movements only, but a single closing and single opening movement, when considered in its spatial relation to the nozzle 18' within one operating cycle, represents for all practical purposes the fourfold mold motion hereinbefore explained. First, the mold sections are open, while in close proximity to the nozzle 18', which condition is illustrated in Fig. 6, with the nozzle being shown in solid lines, and corresponds to that of Fig. 1; next the open mold sections close, with the mold sections still in the same close proximity to the nozzle (see Fig. 2); then, the nozzle moves away from the closed mold, which condition corresponds to that shown in Fig. 3; and finally, while in the same spaced position relative to the nozzle, the mold opens, and this condition corresponds to that of Fig. 4.

The construction of Fig. 6 makes continuous extrusion at the highest rate possible just as the construction of Figs. 1 to 4 does.

In the embodiment of the invention illustrated in Fig. 7, a slide 52 is adapted to move on a rail 54. Two sectional molds, generally designated 56 and 58, respectively, are mounted on the slide for sliding movements and also to be moved away from and toward the slide. A tube 20" which is extruded and suspends from a nozzle 18" is alternatingly received by the molds 56 and 58. The two sections of each of the molds are operated to close upon a segment of the tube and to open thereafter. When, for example, the sections of the mold 56 have been closed and the mold 56, while in close proximity to the nozzle 18" or at its high level, has thus been charged with a tube segment, the mold is lowered to its low level and either at the same time, or subsequently, slidingly moved to the right, when looking toward the drawing, for the discharge of a blown article. The movement of the slide 52 to the right brings the mold 58 to the low level place below freshly extruded tubing. The latter mold, while in open condition, is now raised to the high level position, closed while still in the high level position, lowered to the low level position, and moved to the left, so that the mold 56, in open condition, will be brought back to the low level position below emerging fresh tubing. The open sections of the mold 56 rise to start a new cycle which involves two molds.

It is within the scope of our invention to use devices other than those shown, for instance, in Figs. 1 to 4 to cause the movement of nozzle and mold with respect to each other, and the closing and opening movements of the mold.

In the form of our invention, shown in Fig. 8, the pneumatic cylinders 32, 32 of Fig. 1 appear replaced by racks 60, 60 and pinions 62, 62. The former derive a reciprocating motion from the circular motion of the latter. In the construction of Fig. 8, the horizontal reciprocation of the mold halves is arrived at exactly as in the case of Figs. 1 to 4; it is the vertical reciprocation that, according to Fig. 8, is achieved in a way different from that shown in Figs. 1 to 4. The rack-and-pinion mechanism imparts vertical reciprocation to an assembly generally designated A, which assembly includes two horizontally arranged pneumatic cylinders 38a, 38a, mold-mounting plates 64, 64, mold sections 12a, 12a and tie and guide rods 66, 66.

In the construction of Fig. 9, mold sections 12b, 12b are again mounted both for a horizontally and a vertically reciprocating motion. Pneumatic cylinders 68, 68 and pistons 70, 70 produce the vertical reciprocation, and a single vertically disposed pneumatic cylinder 72 and its piston 74 provide the horizontal reciprocation. There is a pair of linkages provided according to Fig. 9, which converts the vertical motions of the piston 74 into horizontal motions of the plates 76, 76, having the mold sections 12b, 12b mounted thereon. Each linkage consists of a lever 78, mounted to swing about 80, and arm 82, and an arm 84. The arms 82, 82 are connected at one end to the levers 78, 78 and at the other end to the mounting plates 76, 76, while the arms 84, 84 are connected to the other end of the levers 78, 78 and to a sliding member 86. The member 86 is secured to the piston 74 and is guided by a rail 88.

As the member 86 reciprocates vertically, swinging motions are imparted to the levers 78, 78 which, in turn, impart a horizontal reciprocation to the mounting plates 76, 76 and mold sections 12b, 12b. The mounting plates 76, 76 are apertured to receive guide rods 100. The guide rods, a pipe communicating with a source of fluid pressure, and a blow pipe take part in the vertical reciprocation of the mold 12b, 12b, the referred to pipe and blow pipe being not shown in Fig. 9.

In Fig. 10, a construction is shown, which uses two pneumatic cylinders 102, 102 to impart vertical reciprocation, and a single horizontally arranged pneumatic cylinder 104 to impart horizontal reciprocation, to the mold (not shown). Two linkages used in accordance with Fig. 10 to transmit the motions of the double-acting piston accommodated in the cylinder 104 comprise two levers 106, 106, mounted to swing about 108, 108, and arms 110, 110. When the double-acting piston is operated to move outwardly, the mold-mounting plates 112, 112 are moved inwardly, and vice versa. A rack- and-pinion arrangement is provided to properly guide the mold sections which are mounted on the plates 112, 112. This guiding device consists of a pinion 114 and two racks 116, 116 which mesh with the pinion and are arranged to move in opposite directions at any one time.

In the construction of Fig. 11, use is made of two pneumatic cylinders 118, 118 which are arranged to impart to the mold sections 12c, 12c both vertical and horizontal reciprocation. A bell crank 120 and an arm 122 are jointed together, for each cylinder, at 124. The free ends of the bell cranks are connected to mold-mounting plates 126, and the free ends of the arms 122 are fixedly connected to a base 128. The elbow of each of the bell cranks is arranged to slide along a guide 130. The free end of a piston 132 of each of the cylinders 118, 118 is connected to an intermediate arm 134 to act upon the respective togglelike joint formed by bell crank and arm, and thus to change the angular relation of the two articulated parts. The movement of the joints 124, 124 toward the pneumatic cylinders tends to straighten out the links of each of the toggle joints, namely, the bell crank 120 and the arm 122, in which case the mold sections will be closed and simultaneously lowered. When the joints 124, 124 are moved away from the cylinders 118, 118, the angle formed by the links of the referred to toggle joints will become smaller, the elbows at 130, 130 will descend, and the mold sections will be opened and raised.

In the light of the description of Figs. 1 to 4, it will be seen that the transition of the condition of Fig. 1 to the condition of Fig. 2, and further to the condition of Fig. 3, corresponds in the case of the construction of Fig. 11 to the changes effected by the movements of the joints 124, 124 toward the cylinders 118, 118. And the transition from the position of Fig. 3 to that of Fig. 4, and further to that of Fig. 1, corresponds in the case of the construction of Fig. 11 to the changes effected by the movement of the joints 124, 124 away from the cylinders.

It will be appreciated that the guide rod arrangement as described with respect to Fig. 9, and shown in Figs. 8 and 9 to 11, may also be used in the case of the construction of Figs. 1 to 4. The rack-and-pinion device shown in Fig. 10 is preferably also used in the cases of Figs. 1 to 4, 8 and 11. Such device is not needed in the construction of Fig. 9 since it is the rail 88 which guides the sliding member 86 and serves, together with the latter, the purpose of properly guiding the mold sections.

It is apparent that the fourfold motion of our invention offers all the advantages inherent in it if the manufacture of the intended hollow articles does not start with freshly extruded tubing, as has been described hereinbefore.

Figure 12:
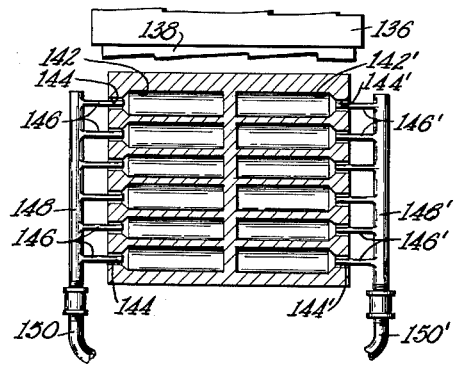
Fig. 12 shows a section of a modified mold, looking toward the half cavities provided in the mold section, the mold being designed for the use of a different extrusion product.
Figure 13:
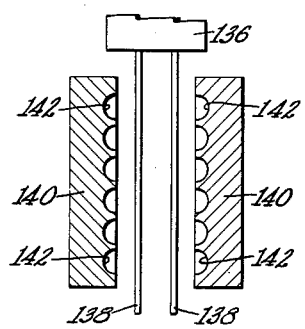
Fig. 13 is a sectional view showing a mold formed of sections as shown in Fig. 12.

According to Figs. 12 and 13, plastic material is extruded from a nozzle 136 in form of two sheets 138, 138 to vertically suspend into the space between two open opposing mold halves 140, 140. The two sheets are substantially parallel to one another. Each of the mold halves is provided with twelve bottle-shaped horizontally extending cavities, with six cavities 142 and 142' one above the other in each of two vertical rows, and a cavity of one row being horizontally aligned in a bottom-to-bottom fashion with a cavity of the other row. The neck parts 144, 144' of the cavities open all in an outward direction, and the neck parts of the cavities of one and the same row open in the same direction. The neck parts of the cavities of the two rows are directed in opposite directions. Blow pipes 146, 146' which are connected to two common main lines 148, 148' enter between the plastic sheets, six blow pipes from one side, and six blow pipes from the opposite side.

During the closing of the mold halves, the two plastic sheets are pressed against one another, and in the closed condition of the mold, the twenty-four half cavities form twelve composite cavities to enclose twelve embryo bottles to be blown to the desired shape by introducing a pressure medium through the lines 148, 148' and the blow pipes 146, 146'. Reference is here made to the parent application Ser. No. 513,852, hereinbefore referred to, for the description of the cutting action of the mold sections, the inflation of the embryo containers, the withdrawal of the blow pipes, the discharge of the blown containers, etc.

In the case of Figs. 12 and 13, the main lines 148, 148' are connected to flexible tubes 150, 150' leading to a fluid pressure-supplying source (not shown). The operation of the mold of Figs. 12 and 13 is the same as has been described in connection with the fourfold mold motion of Figs. 1 to 4.

Figure 14:
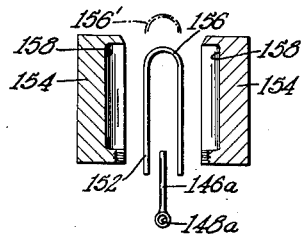
Fig. 14 is a horizontal section through a modified mold, using a different extrusion product.

In Fig. 14, a sheeting 152 of U-shaped cross section is shown as having been extruded between two open mold sections 154, 154. The cross-sectional U lies flat, and the free ends of the legs of the U point sideways. The two legs constitute two spaced sheets as the sheets 138, 138 of Figs. 12 and 13. If the sheeting is arranged to have the web portion 156' lie outside the closed mold, there is no difference between the further work and the work described with regard to Figs. 12 and 13, except that there is only one row of cavities 158, 158 in each of the mold sections and, therefore, only a single main line 148a and a single row of blow pipes 146a. The mold sections pinch off as many segments of each of the plastic sheets as are half cavities in a mold section. If, however, the web portion 156 of the U comes to lie within the mold when closed, then the material of the web portion does not undergo any pinching when the mold closes. The curved web remains intact, which results in a seamless bottom of the container produced. It is only across the legs 152, 152 of the U-shaped structure where pinching, sealing, and press-molding against the blow pipes occur. Further details as to the construction of Fig. 14 are contained in the parent application Ser. No. 513,852.

There are still other processes and apparatus for blowing plastic articles, which can be applied to great advantage to the fourfold motion of the present invention.

Figure 15:
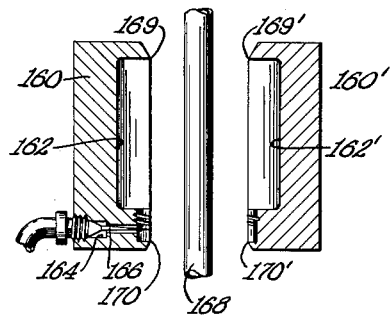
Fig. 15 is a sectional view of a modified mold.
Figure 16:
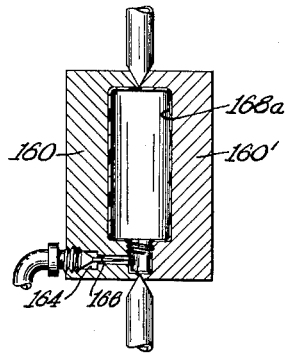
Fig. 16 is a sectional view showing the mold of Fig. 15 in closed condition.

For instance, the mold shown in Figs. 15 and 16 consists of sections or halves 160, 160'. The two halves are movable toward and away from each other and are provided with a mold cavity 162 and 162'. These cavities oppose each other and form a composite cavity for a bottle. The mold half 160 is provided with an opening 164 which communicates between the outside and the neck part of the mold cavity 162. A hollow needle 166, such as a hypodermic needle, is disposed within the opening and extends into the cavity 162. A tubing 168 of a plastic material has been extruded from an extrusion machine (not shown) and caused to suspend, while hot and soft, into the space between the mold sections.

The condition shown in Fig. 15 corresponds to that shown in Fig. 1. When the mold sections are operated to close tightly against each other, sharp edges 168 and 170 of the mold half 160, and edges 168' and 170' of the mold half 160', compress the tube and provide thereby a sealed tube segment within the composite cavity, except for the opening made by the needle 166. As the mold halves close upon each other, the needle pierces the wall of the tube and enters the otherwise sealed tube segment. A fluid is now forced through the hollow needle into the sealed tube segment to expand the tube against the inside walls of the composite cavity and to form the bottle 168a. (See Fig. 16.)

The mold of Figs. 15 and 16 is operated, as has been stated, in the same manner as the mold of Figs. 1 to 4, and 12 and 13, respectively. The successive stages are closing the mold at a high level or in proximity to the nozzle, lowering the closed mold to a low level or a far apart position, opening at the low level, and raising the open mold to the high level.

It is believed that the method of our invention, as well as the construction and operation of the forms of apparatus for practicing the invention, as shown, and the many advantages thereof, will be understood from the foregoing detailed description. In reviewing some of the features of the invention, it is pointed out that the invention permits continuous extrusion, for instance, of a vertically suspended tube. The extruded product is received while the mold is in proximity to the nozzle, and forming, cooling, and ejecting of the finished product takes place while mold and nozzle are moved into or are in the far apart positions. Our method makes it possible to save from 50% to 75% in mold costs, as compared with known methods requiring more than a single mold to ensure the same output. The relative movement of nozzle and mold permits the mold to stay closed during 90% of the cycle and thus to utilize a great portion of the time for a cycle for cooling purposes.

It will be apparent that while we have shown and described our invention in a few preferred forms, many changes and modifications may be made without departing from the spirit of the invention defined in the appended claims.

We claim:

1. A process for the manufacture of hollow articles from plastics, using a single mold, comprising extruding from an extrusion nozzle at least a single formation of the plastic used to suspend vertically, in a condition of plasticity, into the open space between opposing sections of a sectional mold, with the mold sections being in a generally parallel relationship, the mold having when closed at least a single cavity conforming in shape to the article to be formed, linearly closing the opposing mold sections, while in proximity to the nozzle, about at least a single segment of the extruded formation, thereby forming an inflatable embryo article within the closed mold, relatively moving the nozzle and closed mold apart along the directional line of extrusion to a far apart position, continuing the extrusion, admitting a fluid pressure medium to the embryo article and thereby expanding the embryo article into molding contact with the mold cavity, opening the mold by linearly moving the mold sections apart, withdrawing the blown article, relatively and linearly moving the nozzle and open mold sections from the far apart position back into the proximate position, and linearly closing the mold sections, while in said proximate position, about at least a single segment of freshly extruded plastic formation.

2. In the process according to claim 1, the opening of the closed mold being effected after nozzle and mold have reached, and while nozzle and mold are in, the far apart position.

3. In the process according to claim 1, the opening of the mold being effected while the nozzle and closed mold are relatively moved apart.

4. In the process according to claim 1, the opening of the closed mold being only partly effected, and withdrawing the blown article prior to the completion of the opening.

5. In the process according to claim 1, said relative movement of the nozzle and closed mold away from each other being carried out at a speed exceeding the rate of extrusion.

6. In the process according to claim 1, causing the mold-enclosed segment of extruded plastic formation to tear from the parent body of plastic material by said relative movement of the nozzle and closed mold away from each other.

7. In the process according to claim 1, having the opposing mold sections, while being closed, move in contact with the bottom surface of the nozzle so as to cut off extruded plastic formation at the nozzle.

8. The process according to claim 1, wherein at least part of said fluid pressure medium is admitted to the embryo article while relatively moving the nozzle and closed mold apart.

9. A process of producing hollow articles of plastic materials, using a single mold, comprising extruding from an extrusion nozzle an open-ended tube of the plastic material used to suspend vertically, in a condition of plasticity, into the open space between opposing open sections of a sectional mold and to have the open tube end slip over a blow pipe, with the mold sections being in a generally parallel relationship, the mold having when closed a cavity conforming in shape to the article to be formed, the blow pipe extending into the mold cavity from opposite the extrusion nozzle and in axial alignment with the extruded tube, linearly closing the opposing mold sections, while in proximity to the nozzle, about a segment of the extruded tube, thereby forming an inflatable embryo article within the closed mold by pinching off and sealing the tube segment at a place remote from the open tube end, and press-molding a portion of the pinched off tube segment against the blow pipe, relatively moving the nozzle and closed mold apart along the directional line of extrusion into a far apart position, continuing the extrusion, admitting a fluid pressure medium to the embryo article through the blow pipe and thereby expanding the embryo article into molding contact with the mold cavity, opening the mold by linearly moving the mold sections apart, withdrawing the blow pipe, removing the blown article, relatively and linearly moving the nozzle and open mold sections from the far apart position back into the proximate position, returning the blow pipe to its tube-receiving position, and linearly closing the mold sections about a segment of freshly extruded plastic tubing.

10. A process for the simultaneous manufacture from plastics of at least two hollow articles, using a single mold, comprising spacedly extruding from an extrusion nozzle at least two sheets of the plastic material used to suspend vertically, in a condition of plasticity, into the open space between opposing sections of a sectional mold, with the mold sections, being in a generally parallel relationship, having as many blow pipes as hollow articles are produced enter sideways the space between extruded sheets, the mold having when closed at least two cavities conforming in shape to the articles to be formed, linearly closing the opposing mold sections, while in proximity to the nozzle, about at least two segments of each extruded plastic sheet, thereby forming at least two inflatable embryo articles within the closed mold by pinching off opposing segments, sealing the opposing segments together along their pinched off edges, and press-molding portions of the opposing segments against the blow pipes, relatively moving the nozzle and closed mold apart along the directional line of extrusion to a far apart position, continuing the extrusion, admitting a fluid pressure medium to the embryo articles through the blow pipes and thereby expanding each embryo article into molding contact with the respective mold cavity, opening the mold by linearly moving the mold sections apart, withdrawing the blow pipes, removing the blown articles, relatively and linearly moving the nozzle and open mold sections from the far apart position back into the proximate position, returning the blow pipes to their position in the space between extruded sheets, and linearly closing the mold sections about at least two segments of each freshly extruded sheet.

11. An apparatus for producing hollow articles of plastic materials, comprising a single sectional mold including two opposing sections, the mold having when closed at least a single cavity conforming in shape to the article to be formed, an extrusion nozzle to extrude at least a single formation of the plastic used to suspend vertically, in a condition of plasticity, into the open space between the opposing mold sections, the mold sections being in a generally parallel relationship, said opposing sections being provided with edges to pinch off at least a single segment of the extruded formation and to form an inflatable embryo article within the closed mold, the embryo article being closed except for at least a single opening, first means entering said opening to inflate said embryo article, and second means to linearly close the opposing mold sections while in proximity to the nozzle, to relatively move the nozzle and closed mold apart along the directional line of extrusion from the proximate position into a far apart position, to linearly open the mold, and to relatively and linearly move the nozzle and the open mold sections from the far apart position into the proximate position.

12. In the apparatus according to claim 11, the second means including two axially aligned cylinders slidingly accommodating pistons for simultaneous reciprocation in opposite directions and supporting the opposing mold sections, and two parallel cylinders extending at right angles to the aligned cylinders, the parallel cylinders accommodating pistons simultaneously reciprocating in the same direction, each piston of the parallel cylinders supporting one of the aligned cylinders.

13. In the apparatus according to claim 11, the second means including two axially aligned cylinders slidingly accommodating pistons for simultaneous reciprocation in opposite directions and supporting the opposing mold section, and two rack-and-pinion drives, each of said drives supporting and acting upon one of the cylinders at a right angle to the alignment of the cylinders, the drives being operated to simultaneously reciprocate in the same direction.

14. In the apparatus according to claim 11, third means mounting the mold sections, the second means including a single cylinder slidingly accommodating a piston, a pair of linkages actuated by the piston of said single cylinder to close and open the opposing mold sections, and two parallel cylinders extending at right angles to the closing and opening movement of the opposing mold sections, and slidingly accommodating pistons simultaneoutly reciprocating in the same direction, the pistons of the two parallel cylinders supporting said third means.

15. In the apparatus according to claim 11, third means mounting the mold sections, the second means including two aligned cylinders slidingly accommodating pistons simultaneously reciprocating in opposite directions, and a pair of linkages actuated by said pistons to close and open the opposing mold sections, and to perform said relative movements of nozzle and closed mold, and nozzle and open mold sections.

16. An apparatus for the manufacture of hollow plastic articles, comprising a single sectional mold including two opposing sections, the mold having when closed a cavity conforming in shape to the article to be formed, a ring-shaped extrusion nozzle to extrude an open-ended tube of the plastic material used to suspend vertically, in a condition of plasticity, into the open space between the mold sections, the mold sections being in a generally parallel relationship, a blow pipe extending into the mold cavity from opposite the extrusion nozzle and in axial alignment with the extruded tube, the mold sections being provided with edges to pinch off and to seal a segment of the extruded tube at a place remote from the leading or open tube end, the mold sections being also adapted to press-mold a portion of the pinched off tube segment against the blow pipe, the mold sections being thus adapted to form an inflatable embryo article within the closed mold, and means to linearly close the opposing mold sections while in proximity to the nozzle, to relatively move the nozzle, on the one hand, and the closed mold and blow pipe, on the other hand, along the directional line of extrusion from the proximate position into a far apart position, to linearly open the mold, to withdraw the blow pipe, to remove the blown article, and to relatively and linearly move the nozzle and the blow pipe and open mold sections from the far apart position into the proximate position.

17. An apparatus for the simultaneous manufacture of at least two plastic hollow articles having an opening, comprising a single sectional mold including two opposing sections, the mold having when closed at least two cavities conforming in shape to the articles to be formed, the cavities being arranged one above the other to extend horizontally and to have the openings directed outwardly, nozzle means to spacedly extrude two sheets of the plastic material used to suspend vertically into the open space between the opposing mold sections, the mold sections being in a generally parallel relationship, at least two blow pipes entering sideways the space between extruded sheets, each blow pipe having an external diameter substantially equal to the internal diameter of the opening of the respective article to be formed, said mold sections being provided with cutting edges to pinch off at least two pairs of opposing segments of the plastic sheets, the mold sections forming in cooperation with the blow pipes at least two inflatable embryo articles including their opening portions, and means to linearly close the opposing mold sections, while in proximity to the nozzle, upon the extruded sheets, to relatively move, on the one hand, the nozzle, and, on the other hand, the closed mold and the blow pipes apart along the directional line of extrusion from said proximate position into a far apart position, to linearly open the mold, and to relatively and linearly move the nozzle and the open mold sections and blow pipes from the far apart position into the proximate position, the blow pipes being mounted to be withdrawn from the molded opening portions in a single direction, while nozzle and mold are in the far apart position, and to be reinserted between the sheets by a movement in opposite direction, while nozzle and mold are in the proximate position.

18. An apparatus for the simultaneous manufacture of at least four plastic hollow articles having an opening, comprising a single sectional mold including two opposing sections, the mold having when closed at least four cavities conforming in shape to the articles to be formed, the cavities being arranged in two rows, each row containing at least two cavities horizontally arranged one above the other, the cavities of each row having their openings directed outwardly and in a direction opposite to the direction of the openings of the cavities of the other row, nozzle means to spacedly extrude two sheets of the plastic material used to suspend vertically into the open space between the opposing mold sections, the mold sections being in a generally parallel relationship, two groups of at least two blow pipes each, the blow pipes of each group extending sideways one above the other into the space between extruded sheets, the opposing mold sections being provided with cutting edges to pinch off at least four pairs of opposing segments of the plastic sheets, and being adapted to form in cooperation with the blow pipes four inflatable embryo articles including their opening portions, the blow pipes also serving as means to inflate the embryo articles, and means to linearly close the opposing mold sections while in proximity to the nozzle, upon the extruded sheets, to relatively move, on the one hand, the nozzle, and, on the other hand, the closed mold and the blow pipes aparts along the directional line of extrusion from said proximate position into a far apart position, to linearly open the mold, and to relatively and linearly move the nozzle and the open mold sections and blow pipes from the far apart position into the proximate position, the blow pipes being mounted to be withdrawn from the molded opening portions in two opposite directions, while nozzle and mold are in the far apart position, and to be reinserted between the sheets while nozzle and mold are in the proximate position.

19. Apparatus for producing hollow articles of plastic materials, including a two-section mold provided with a cavity conforming in shape to the article to be formed, a ring-shaped extrusion nozzle outside the mold to extrude an open-ended tube into the space within the open mold sections, a blow pipe extending into the mold cavity in axial alignment with the extruded tube to allow the open tube end to slip over the blow pipe, the mold sections being provided with edges to pinch off the tube portion within the mold, two parallel cylinders serving to relatively move the nozzle and the mold toward and from each other, each of said parallel cylinders slidingly receiving a piston, said two pistons supporting two cylinders extending in axial alignment at right angles to the parallel cylinders, the axially aligned cylinders slidingly receiving pistons moving toward and from each other and supporting the sections of said mold.

References Cited in the file of this patent

UNITED STATES PATENTS

| | | |
|---|---|---|
| 1,029,586 | Burelle | Mar. 11, 1953 |
| 2,787,023 | Hagen et al. | Apr. 2, 1957 |
| 2,810,934 | Bailey | Oct. 29, 1957 |
| 2,903,740 | Parfrey | Sept. 15, 1959 |